May 22, 1934.   K. MORSBACH ET AL   1,960,062
MOTION PICTURE CAMERA
Filed July 2, 1931
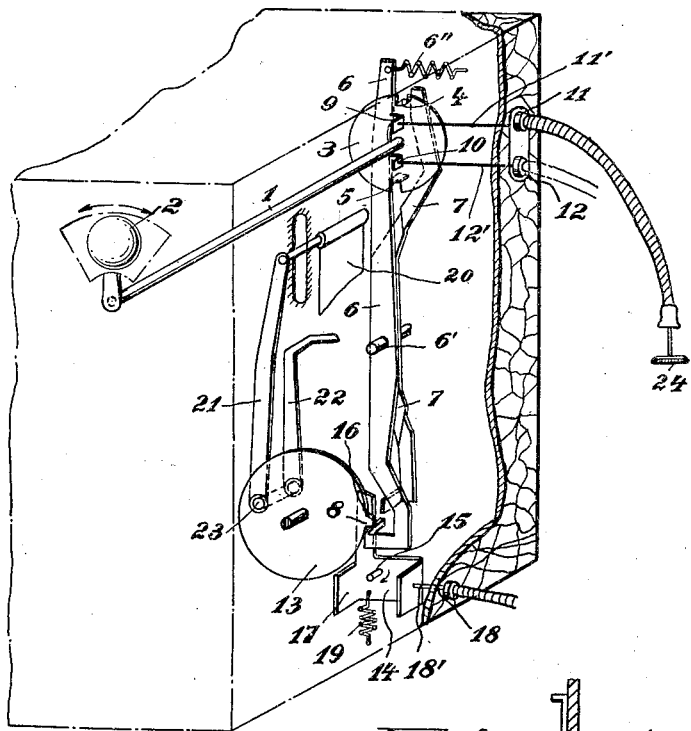
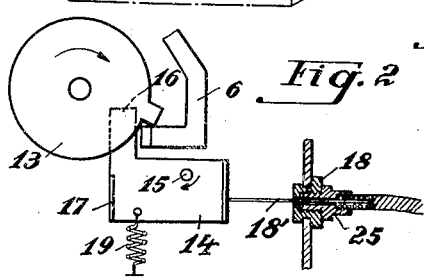
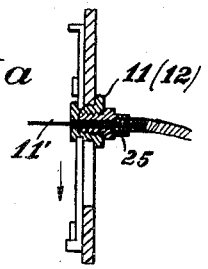
Inventors:
Kurt Morsbach
Max Hettler
Kurt Raschke
by
Lotka & Kehlenbeck
Attorneys.

Patented May 22, 1934

1,960,062

UNITED STATES PATENT OFFICE 1,960,062

MOTION PICTURE CAMERA

Kurt Morsbach, Berlin-Grunewald, and Max Hettler, and Kurt Raschke, Berlin, Germany, assignors to Projector G. m. b. H., Berlin, Germany, a corporation of Germany Application July 2, 1931, Serial No. 548,278
In Germany August 30, 1930

8 Claims. (Cl. 88—18)

Our invention relates to an arrangement for motion picture cameras driven by clockwork and has for its object to provide an arrangement whereby at the operator's option, single pictures or motion pictures may be obtained. A single element or member serves for setting the apparatus to a position in which the clockwork is thrown out of action and for the taking of single or motion pictures and their simultaneous release. The releasing member is preferably a slide knob. With motion picture cameras intended for amateurs, the exposures are generally made by hand without the use of a tripod. The shutter speed of such cameras is indeed sufficient to permit such exposures to be made without causing the pictures to become blurred by an unsteady holding of the apparatus, but there is danger nevertheless that when the release knob is operated directly by hand, the jar will move the camera slightly so that the first portion of the scene taken will be shifted or wobbled out of place. This objection also exists in ordinary photographic cameras for single exposures, when the shutter is operated by clockwork; in these cases, however, the objection is relatively slight and certainly not so serious as with motion picture cameras, since the latter require a much stronger clockwork requiring greater power for its release and therefore increasing the danger of jerks when the release is made too forcibly.

In order to overcome the difficulty mentioned above, we prefer to effect the release of the apparatus by means of a flexible pull or push connection such as a string or wire, a so-called Bowden pull connector being particularly suitable. This flexible pull connection is preferably not attached directly to the knob provided for effecting the release of the apparatus, since this would necessitate angle members or the like which would interfere with the smooth outline of the apparatus, but we prefer to attach the flexible pull connection to a control disk actuated by the release knob and acting on levers which effect the desired kind of release of the clockwork. This provides a very easy and jerkless release. The control disk may be provided with devices or members for direct attachment of the flexible pull connection. This flexible pull connection must be capable of acting at different points or on different members carried by the control disk, in order to give said disk the various movements required by the particular construction of the camera. When using a flexible pull connection such as above referred to, the housing of the camera may be provided with two individual connections or with a single connection movable to different positions.

Our invention also contemplates the provision of a separate device which permits the making of time exposures, and this device may also be released or controlled by means of a flexible pull connection. This device consists of an additional release for the shutter control device driven by the clockwork; the motion of this shutter control device is arrested at the moment of the widest shutter opening and is concluded after the taking of the picture, with a time exposure, an instantaneous exposure, a single picture or a series of motion pictures.

In the accompanying drawing, we have illustrated a satisfactory and typical embodiment of our invention, Fig. 1 being a perspective view showing a portion of a camera with our improvements applied thereto; Fig. 1a being another construction for attaching a releasing wire and Fig. 2 showing in front elevation with parts in section, the release device for individual time exposures in connection with the disk controlling the shutter opening.

In Fig. 1 dotted lines indicate a portion of the camera casing, in which a rock shaft 1 is suitably journalled. This shaft may be brought to different positions by means of a knob 2 located exteriorly of the camera casing, and on this shaft is secured rigidly a control disk 3 provided with two lugs 4, 5 projecting therefrom laterally. These two lugs are adapted to engage a lever 6 fulcrumed at 6' and under the influence of a spring 6'', as well as a lever 7 which is also fulcrumed at 6' but independently of the lever 6. As explained below, rocking the shaft 1 in one direction will move only the lever 6, while rocking the shaft in the opposite direction will move both levers 6 and 7. At its lower end the lever 6 has a lateral projection adapted to extend into the path of a tooth or projection 8 of another control disk 13, which rotates together with the clockwork or spring motor (not shown) and actuates both the diaphragm control 20 by a connecting-rod 21 and the film-feeding claw or gripper 22. The rods 21 and 22 are pivoted on a cranked arm, this being secured rigidly on the disc 13 at 23.

If the lever 6 alone is operated by swinging the knob 2 contraclockwise from the position shown in Fig. 1, in which case the lug 4 acts on the lever 6, while the lug 5, owing to the bent or cranked shape of the upper portion of the lever 7, does not shift such lever 7, the lower end of the lever 6 will be swung away from the disk 13 so as to clear the projection 8 and allow said disk to rotate together with the spring motor and the film-feeding mechanism operated thereby in any well known or suitable manner for the making of a motion picture exposure. If, however, the knob 2 is rocked in the opposite direction, so as to swing the disk 3 clockwise, in Fig. 1, the lug 5 will rock the lever 6 in the same manner as just explained above, and at the same time the lug 4 will rock the lever 7 in the opposite direction so that the laterally projecting lower end of the lever 7 will be brought into the path of the projection 8; thus, after completing one revolution, said projection will come in contact with the lower end of lever 7 and be arrested thereby. This is the operation which will be used in the case of making a single exposure instead of taking motion pictures.

The control disk 3 is also provided at diametrically opposite points with two projections 9 and 10 which may be in the nature of angle irons. In approximate registry with these projections, Fig. 1 shows sleeves or sockets 11, 12 for the passage of flexible push connections 11' and 12' respectively. Each of these pushing members consists of a thin wire which is slidable lengthwise in a flexible tube of coiled wire and which has an actuating knob 24 at its other end. The flexible tube is attached on a screwpart 25 which serves to attach it in one of the sleeves 11 or 12.

Upon actuating the upper connection 11', the control disk 3 will be rocked in one direction, and upon operating the lower connection 12', said disk will be rocked in the opposite direction, with the same effect as when the said disk is rocked by means of the knob 2 as described above. It will thus be understood that the disk 3 may be actuated either by the knob 2 or by one or the other of the connections 11', 12'.

Adjacent to the lower control disk 13 which as referred to above is connected with the diaphragm control 20 and with the film-feeding mechanism 22, an angular member 14 is mounted to swing about a fulcrum 15. This member has a projection 16 adapted to be brought in contact with the lateral projection at the lower end of the lever 6. The member 14 also has an arm 17 at right angles to the projection 16 and whenever the projection 16 is brought into the path of the lever 6, the arm 17 will come into the path of the tooth 8 on the control disk 13. The member 14 may be swung on its pivot by means of a flexible pull connection 18' passing through a sleeve or socket 18 secured to a wall of the camera casing. A spring 19 serves to return the member 14 to its normal position, in the direction opposite to the pull of the connection 18'. The connections shown at 11', 12', 18' may be of the same character and we prefer to employ a so-called Bowden pull connection at these three points.

If by the release of the pull connection 18', the member 14 is swung about its pivot 15 (clockwise Fig. 2), as will be done when it is desired to make a time exposure, the projection 16 will swing the lever 6 away from the control disk 8 so as to release the tooth 8 and permit said disk and the parts connected therewith to be rotated in the direction indicated by the arrow until said tooth is arrested by the arm 17 which by the same rocking movement of the member 14 has been brought into the path of said tooth 8. At the moment that the disk is thus arrested, the diaphragm controlled by the movement of the disk 13 through the parts 20, 21 is open to the maximum extent and the film can be exposed for the desired length of time in the well known manner. When the flexible pull connection 18' is released, the spring 19 will pull the angular member 14 back to its initial position, whereby the arm 17 will release the tooth 8 and the disk 13 will rotate until said tooth engages the projecting lower end of the lever 6 which in the meantime has been returned to its original position by the spring 6''. During this movement, the diaphragm is closed and the film is fed the width of one picture.

Various modifications may be made without departing from the nature of our invention as defined in the appended claims.

Instead of providing two connections such as 11' and 12' leading to the control disk 3 on different sides of the rock shaft 1, we might provide a single flexible connection and arrange to have the attachment of said connection to the disk 3, or the point at which such flexible connection operates on the disk, shiftable from one side of the shaft 1 to the other; in other words, such flexible connection might be shiftable as shown in Fig. 1a by shifting the socket 11 from its upper position at which the pushing wire would operate on the disk 3 at the projection 9, to the other position at which the flexible releasing wire would operate on the disk 3 against the projection 10.

We claim:

1. A motion picture camera including diaphragm-controlling means and means to feed the film for the taking of motion pictures, actuating means for said diaphragm-controlling means and for said film-feeding means, a pivoted control disc capable of rocking in either direction from its normal position, levers controlled by said disc and co-operating selectively with said actuating means in such a manner that rocking said disc from its normal position in one direction will set the said actuating means for the taking of motion pictures, while rocking the control disc from its normal position in the opposite direction will cause said actuating means to be arrested after the diaphragm has been opened once, for the taking of a single picture.

2. A motion picture camera including diaphragm-controlling means and means to feed the film for the taking of motion pictures, actuating means for said diaphragm-controlling means and for said film-feeding means, a pivoted control member capable of rocking in either direction from its normal position and provided with actuating projections on opposite sides of its axis, levers controlled by the actuating projections of said control member and cooperating selectively with said actuating means in such a manner that rocking said control member from its normal position in one direction will set the said actuating means for the taking of motion pictures, while rocking the control member from its normal position in the opposite direction will cause said actuating means to be arrested after the diaphragm has been opened once, for the taking of a single picture, and operating means for rocking said control member in one direction or the other.

3. A motion picture camera including diaphragm-controlling means and means to feed the film for the taking of motion pictures, actuating means for said diaphragm-controlling means and for said film-feeding means, a pivoted control member capable of rocking in either direction from its normal position, levers controlled by said control member and cooperating selectively with said actuating means in such a manner that rocking said control member from its normal position in one direction will set the said actuating means for the taking of motion pictures, while rocking the control member from its normal position in the opposite direction will cause said actuating means to be arrested after the diaphragm has been opened once, for the taking of a single picture, and an actuating wire the operative portion of which is shiftable to engage said control member on one side of its axis or the other to selectively rock said control member in one direction or the other.

4. A motion picture camera including diaphragm-controlling means and means to feed the film for the taking of motion pictures, actuating means for said diaphragm-controlling means and for said film-feeding means, a pivoted control member capable of rocking in either direction from its normal position and provided with engaging surfaces on opposite sides of its axis, levers controlled by said control member and cooperating selectively with said actuating means in such a manner that rocking said control member from its normal position in one direction will set the said actuating means for the taking of motion pictures, while rocking the control member from its normal position in the opposite direction will cause said actuating means to be arrested after the diaphragm has been opened once, for the taking of a single picture, a socket movable along a wall of said camera, relatively to said engaging surfaces of the control member, and an actuating wire carried by said socket into cooperative relation to one or the other of said engaging surfaces to selectively rock said control member in one direction or the other.

5. A motion picture camera including diaphragm-controlling means and means to feed the film for the taking of motion pictures, a rotatable disk to actuate both said diaphragm-controlling means and said film-feeding means, a pivotally mounted control disc movable in opposite directions from its normal position, pivotally mounted levers controlled by said control disc and provided with projections one of which is arranged to arrest said actuating disk, control means to move said control disc in one direction or the other in such a manner that upon actuation of said control means to move the control disc in either one direction or the other one of said levers will release the actuating disk, while the other lever will remain unaffected by movement of the control disc in one direction, but upon movement of the control disc in the other direction will arrest the actuating disk after one revolution thereof, for the taking of single pictures.

6. A motion picture camera including diaphragm-controlling means and a claw to feed the film for the taking of motion pictures, a rotatable disk to actuate both said film-feeding claw and said diaphragm-controlling means, a pivotally mounted locking lever for arresting said actuating disk, another pivotally mounted lever, a pivotally counted control disc for operating both of said levers, control means to move said control disc from its normal position in one or the other of two different directions, in such a manner that moving the control disc in one of said directions will cause the first-mentioned lever to release the actuating disk, for the taking of motion pictures, while moving the control disc in the other direction will cause the said first-mentioned lever to release such actuating disk temporarily, and the second-mentioned lever to arrest such actuating disk after one revolution, for the taking of single pictures.

7. A motion picture camera according to claim 6, in which a control means movable in two directions from its normal position, is provided to move the control disc either to the position for the taking of motion pictures or the position for the taking of single pictures.

8. A motion picture camera including diaphragm-controlling means and means to feed the film for the taking of motion pictures, means to actuate said diaphragm-controlling means and said film-feeding means, a pivoted locking lever for arresting said actuating means, another pivoted lever operatively related to said locking lever, a pivotally mounted control member for actuating both of said levers in such a manner that shifting the first-mentioned lever alone from its position of rest will release the actuating means for the making of motion pictures, while shifting both of said levers will cause the said actuating means to be first released by the first-mentioned lever and then, after a revolution, arrested by the other lever, an additional pivotally mounted control member provided with two projections one of which operates to bring said locking lever into the position in which it releases the actuating means, while the other projection, upon the shifting of said additional control member from its normal position, arrests said actuating means, after its release, in a position corresponding to the open position of the diaphragm, and means for restoring said additional control member to its normal positon to release the actuating means for closing the diaphragm and feeding the film, and to cause the first-mentioned lever to resume the normal position in which it locks said actuating means.

KURT MORSBACH.
MAX HETTLER.
KURT RASCHKE.